United States Patent
Woods et al.

[11] Patent Number: 5,823,726
[45] Date of Patent: Oct. 20, 1998

[54] REINFORCED SLOTTED VOID FILLER

[75] Inventors: James L. Woods; Robert F. Thomasino, both of Denver, Colo.

[73] Assignee: Damage Prevention Company, Denver, Colo.

[21] Appl. No.: 832,240

[22] Filed: Apr. 3, 1997

[51] Int. Cl.⁶ .............................. B60P 7/16; B60P 7/135
[52] U.S. Cl. .......................... 410/155; 410/122; 410/154
[58] Field of Search .................................... 410/121, 154, 410/155, 122; 229/120.36; 206/593, 814

[56] References Cited

U.S. PATENT DOCUMENTS

| | | |
|---|---|---|
| 2,196,470 | 4/1940 | Montgomery et al. ............. 410/154 X |
| 3,421,451 | 1/1969 | Brucks . |
| 3,424,108 | 1/1969 | Vargen . |
| 3,837,560 | 9/1974 | Kuchuris et al. . |
| 3,850,112 | 11/1974 | Jaski . |
| 3,861,538 | 1/1975 | Locke ...................................... 410/155 |
| 4,187,975 | 2/1980 | Shepherd ........................... 229/120.36 |
| 4,230,049 | 10/1980 | Horne . |
| 4,363,579 | 12/1982 | Rogers ................................... 410/154 |
| 4,444,535 | 4/1984 | VanMersbergen ...................... 410/121 |
| 4,494,897 | 1/1985 | Rogers ................................... 410/154 |
| 4,795,083 | 1/1989 | Johnske . |
| 5,102,272 | 4/1992 | Woods et al. ............................ 410/154 |
| 5,190,212 | 3/1993 | Morris ............................ 229/120.36 X |
| 5,332,149 | 7/1994 | Gepfer . |
| 5,356,251 | 10/1994 | Sisco et al. ............................. 410/154 |
| 5,484,241 | 1/1996 | Haywood et al. ...................... 410/154 |

Primary Examiner—Stephen T. Gordon
Attorney, Agent, or Firm—Pittenger & Smith, P.C.

[57] ABSTRACT

In a void filler wherein the members are connected and coupled by means of a complementary slot, the slot is reinforced by sandwiching a reinforcing strip between the laminations of the void filler members so as to surround the area of the slot and prevent the member from folding and collapsing in this area. One or more reinforcing strips can be sandwiched between the laminations or sheets making up the void filler member with the grain of the reinforcing strip positioned perpendicular to the parallel flutes of the corrugated material forming the laminated sheets. The reinforcing strip can vary in size from surrounding the immediate area of the slot itself to having the same size as the laminated sheets. An embossed groove can be provided which is slightly larger then the reinforcement strip so that the thickness of the reinforcing strip will be absorbed between the laminations to prevent added thickness in the void filler member.

20 Claims, 3 Drawing Sheets

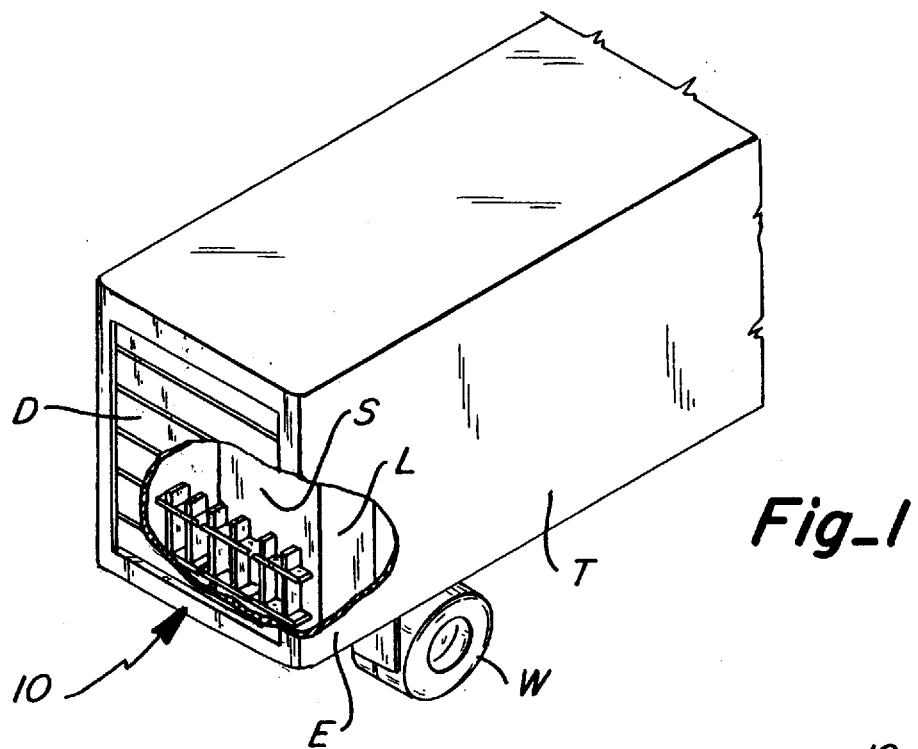
Fig_1
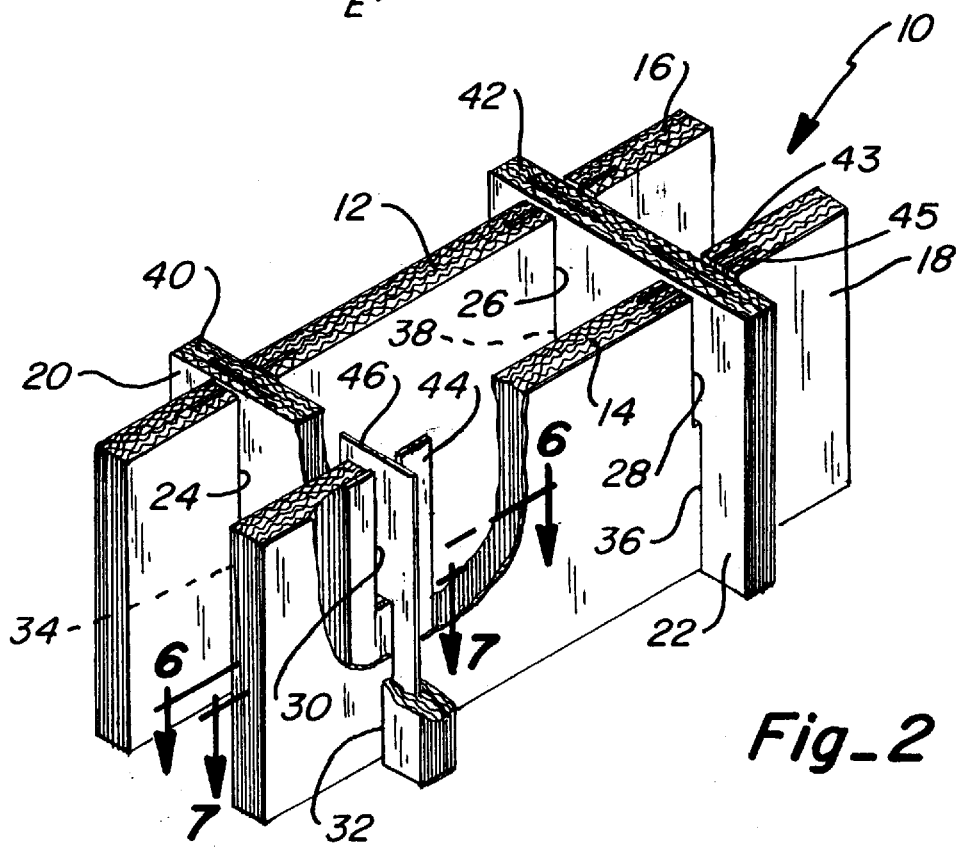
Fig_2

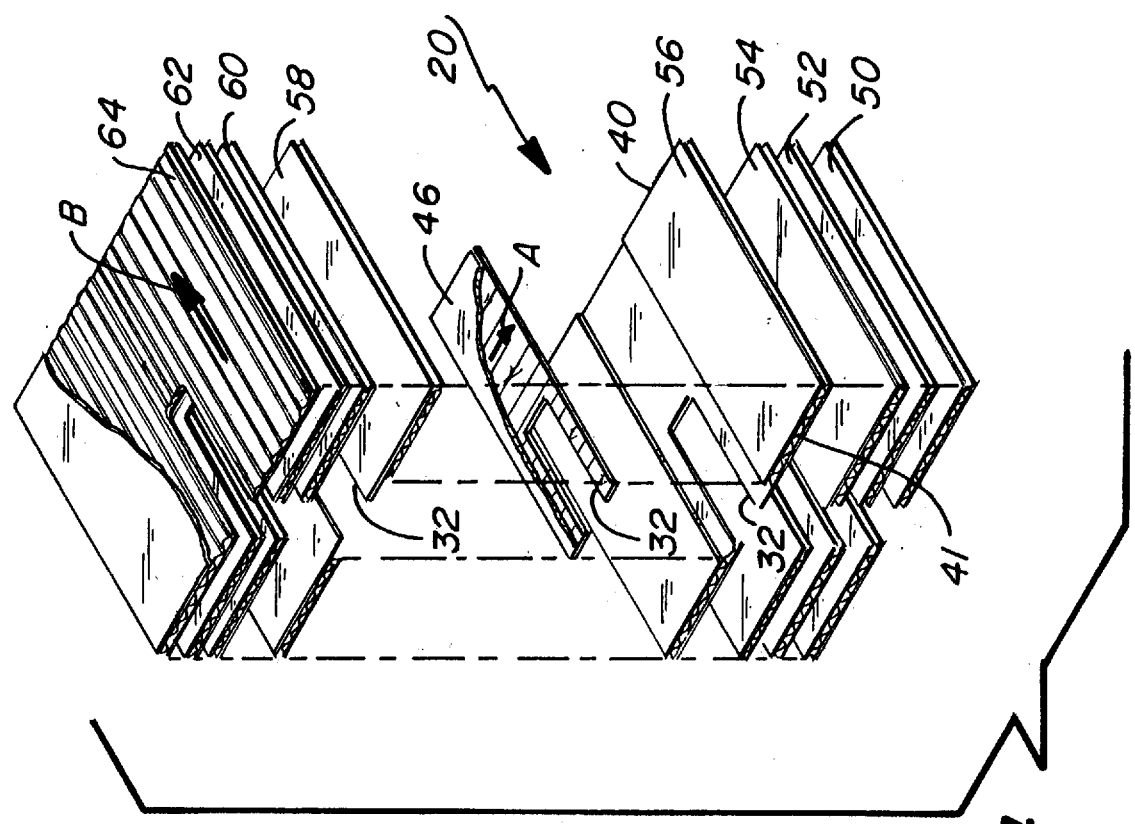
Fig_4
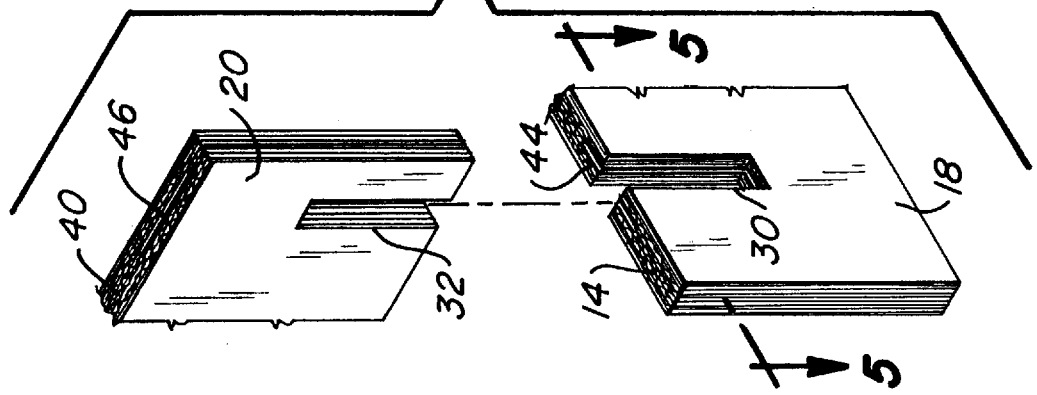
Fig_3

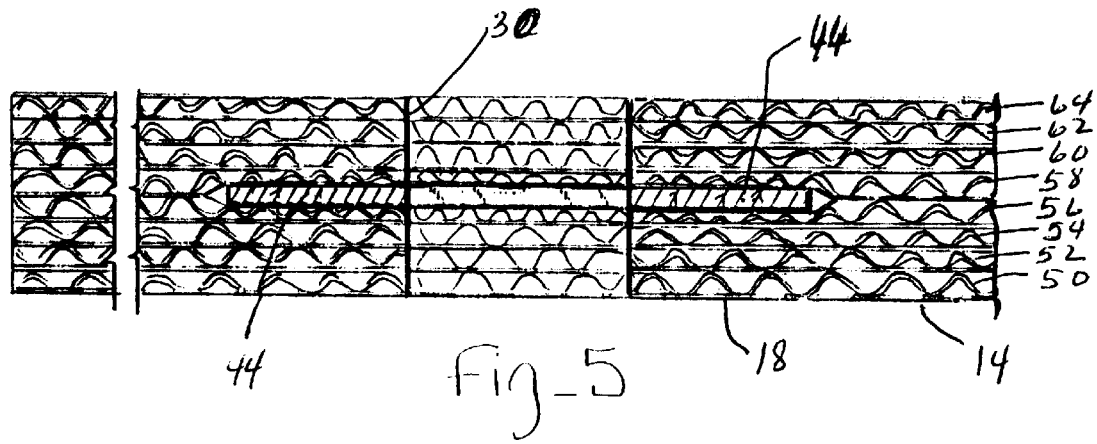
Fig_5
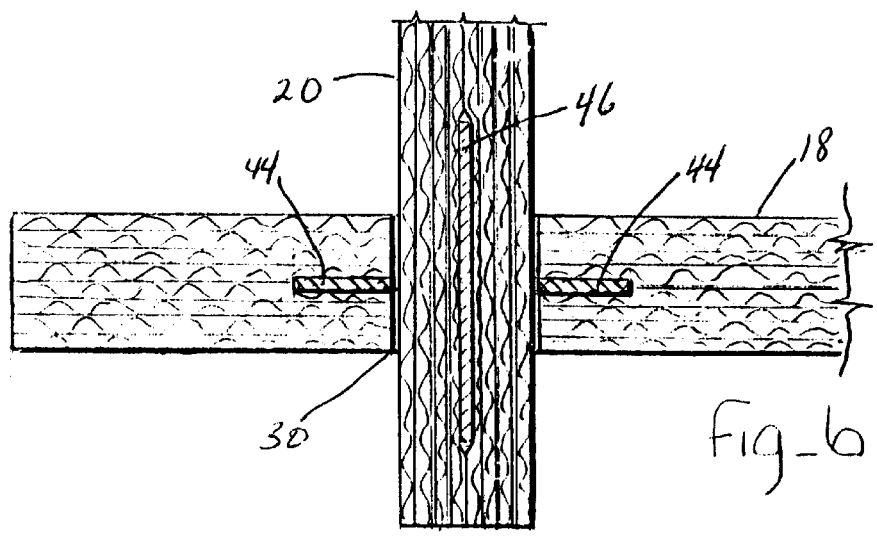
Fig_6
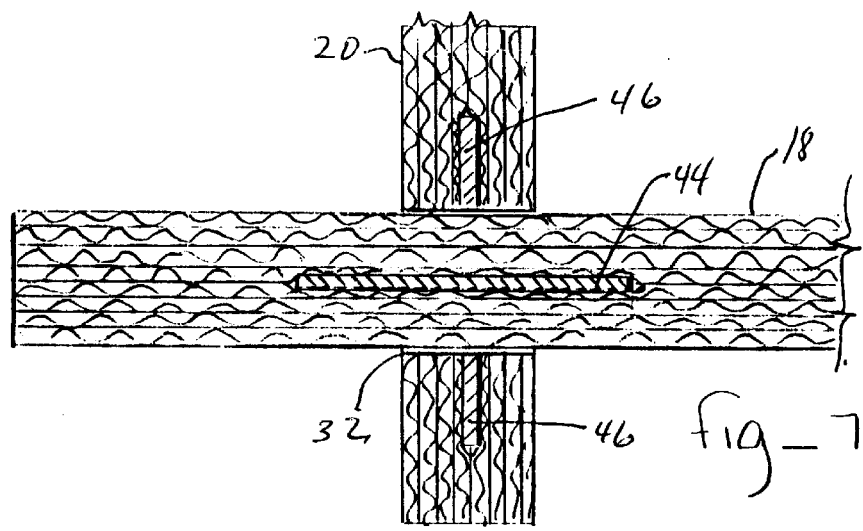
Fig_7

REINFORCED SLOTTED VOID FILLER

FIELD OF THE INVENTION

This invention is directed to a slotted void filler having a reinforced slot. It is more specifically directed to a plurality of members made up of multiple sheets of corrugated material having a complementary reinforced slot for coupling the members together in a void filler configuration.

BACKGROUND OF THE INVENTION

In transporting various types of cargo or lading within railroad freight cars, trucks or other vehicles, invariably the horizontal dimensions of the lading does not completely fill the interior space within the vehicle. Thus, there are voids usually left between the the individual items of the lading or between the lading and the walls of the vehicle. If this void is left unfilled the lading, during movement of the vehicle, will shift and, in some cases, cause considerable damage to the lading and/or the vehicle.

In dense weight cargo positioned in over-the-road trailers another shipping problem occurs. The lading within the trailer must be balanced over the axles for proper transportation and safe hauling. This generally involves a large void in both the nose and rear of the trailer, inasmuch as the lading must be centered in the trailer. A void filler serves as a lightweight solution to the problem creating an artificial bulkhead in the nose of the trailer and, if necessary, providing a bulkhead at the rear between the lading and the trailer doors.

In railcars wood blocking and bracing and other methods, such as stacks of wood pallets or honeycomb panels are used longitudinally to reduce the void that remains at the center of the railcar. Typically air dunnage bags are inflated in the center of the car, thereby exerting pressure against the lading at both ends of the car thus, securing and bracing the lading from moving. A smaller void at the center of the car allows the air dunnage bag to exert greater pressure and thus, better secure the lading. In order to accommodate this, void fillers are inserted between the air dunnage bags and the surface of the lading in order to reduce the overall void that may be present.

In the past, void fillers made up of two or more interfitting flat members and having the same depth dimension can be connected through a complementary slot so as to hold the members in rigid relationship to each other. The members are usually fabricated from multiple layers of corrugated cardboard sheet material which are glued together in a laminated or layered configuration having a relatively thick overall dimension. In most cases, the corrugated flutes within the corrugated material are aligned in one direction and arranged so that when the members are positioned as a void filler the corrugated flutes will be perpendicular to the face of the lading or load. These members are usually held together by complementary slots which extend halfway through the depth of the members. In this way, the members will connect with each other, usually so that they are positioned at 90° to each other, thus forming different desirable patterns. In some cases these patterns take on the shape of an "X" or "criss-crossed" or "staggered" configuration and even an egg crate or cell type configuration.

Out of necessity, in order to utilize the inherent strength of the corrugated void filler member the connecting slots are necessarily arranged parallel to the flutes of the corrugated material making up the member. Thus, the slotted cut-out weakens the material in the direction of the corrugated flutes which can cause the members to fold or bend, usually starting at the corners of the slots. Because of this, minor lateral forces on the void filler can cause the void filler to fold and collapse negating the strength and advantage of this type of void filler.

INFORMATION DISCLOSURE STATEMENT

The following section is provided in order to comply with the applicant's acknowledged duty to inform the Patent Office and public of any pertinent information of which they are aware.

The Shepherd patent (U.S. Pat. No. 4,187,975) discloses a combination of corrugated and fiberboard partition spacers in which the partitions are slotted from one edge and in which the slots of longitude and transverse partitions are reversely oriented and aligned. Normally a plurality of fiberboard partitions are provided with a provision of extra wide slots at selected locations for the insertion of specific corrugated partitions. The intermixing of corrugated partitions with fiberboard partitions is stated to increase the overall stacking strength of the spacers. While slots are used to interfit the partitions, there is no provision for reinforcing the slots to prevent folding or collapse of the partitions.

The Kuchuris et al. patent (U.S. Pat. No. 3,837,560) discloses a partition structure for storage containers having a plurality of interfitting partition strips with interlocking slots. The strips are formed from expanded polystyrene with the slots formed by hot wire cutting which forms a higher density on the edge of the strip which provides additional physical strength for the partitions. There is nothing in this patent which gives any indication of enforcing the slots by the insertion of additional reinforcing materials.

The Brucks patent (U.S. Pat. No. 3,421,451), the Vargen patent (U.S. Pat. No. 3,424,108) and Jaski patent (U.S. Pat. No. 3,850,112) disclose reusable filler devices which are made up of a plurality of U-shaped channels which are slotted along the leg members so that they fit and interlock to form a plurality of dunnage channel members for supporting and positioning loads within vehicles. Although slots are provided for holding the U-shaped channel members in position, there is no mention of any attempt to reinforce these slotted areas.

The Johnske patent (U.S. Pat. No. 4,795,083) discloses an assembled, slotted partition apparatus which has a slotted arrangement with an added locking feature. The lock used in conjunction with the slot is an additional slot wherein a tab engages the slot to lock the pieces in position. Again, there is no disclosure in this patent of any reinforcing arrangement for the slotted area.

The VanMersbergen patent (U.S. Pat. No. 4,444,535) discloses a blank of corrugated cardboard which through fold lines and slots form a dunnage plug or void filler. The disclosed arrangement forms a plurality of U-shaped members which are held in position by bend and fold lines used in conjunction with a plurality of slots to lock the formed member in position. There is no teaching in this patent of the reinforcement of the slots which are shown in this patent.

The Gepfer patent (U.S. Pat. No. 5,332,149) shows a lattice of partition panels wherein slots are used to interconnect the partitions within the container and spaced voids are provided along the side walls of the container for holding the partitions in position. No reinforcement is provided in the slotted areas. In addition, the lattice of partition panels is shown to fold sideways which, in turn, has a tendency to crease and bend the partition in the slotted area.

The Rogers patent (U.S. Pat. No. 4,363,579) shows a void filler having a plurality of side members which attach to a center member through a plurality of slots. The slots allow the members to be retained and locked in position forming the completed void filler. Again, there is no teaching of the reinforcement of the slotted area in the center member.

The Horne patent (U.S. Pat. No. 4,230,049) discloses a rather complex arrangement for forming a composite pallet. Interleaving slots are provided between the various elements making up a plurality of intersecting partitions which forms a platform area. Leg portions are formed in a U-shaped configuration and are attached to the platform by means of a slotted arrangement. The pallet composite material is coated with a plastic coating to coat and bind the partitions in place. This patent does not in any way teach the inclusion of a reinforcing provision in the slotted areas provided in connection with the partition.

SUMMARY OF THE INVENTION

Void fillers presently used in the industry are made up of a plurality of members which are interconnected with each other. These void fillers are usually provided with a slot in one or both of the intersecting members. The members themselves are usually quite thick, ranging anywhere from as little as one-quarter inch to several inches or more. In most cases, these members are made by stacking or laminating a number of sheets of corrugated fiberboard or cardboard together and securing them with a suitable adhesive or glue to form a rigid, relatively flat sheet member. The number of layers or sheets used to make up the individual members is determined by the overall required thickness and the longitudinal strength of the individual members and thus, the void filler itself. In many cases, since the compression forces holding the load in place are applied along one axis, the flutes of the corrugated material are usually aligned in most or all of the sheets making up the member in a direction which is parallel to the axis in which the forces are applied.

In many cases, the members are held in place and allowed to interfit with each other by means of a complementary slot provided in each of the members. The slots extend approximately one-half of the width of the member so that when two members are assembled, their outer edge surfaces will coincide. On the other hand, it is also possible that one slot can be less then one-half or greater then one-half with the complementary slot in the mating member adjusted accordingly. It is also possible that the depths of the slots will not be complementary so that the edges of the void filler members will not coincide and one will protrude further then the other. In this way, the applied forces will be applied to one member on one edge, while the opposing forces will be applied to the opposite edge of the corresponding interfiting member. In this configuration the forces within the void filler are transferred at the base of the slots.

The present invention provides a means of reinforcing the slot in the interfiting members making up a void filler or similar type of object. In this embodiment one, two or more strips of reinforcing sheet material, such as fiberboard or non-corrugated board, can be sandwiched in between the sheets of material making up the void filler member. The reinforcing sheet is centrally positioned in the area in which the slot will be cut in the member. The width and length of the reinforcing sheet material is intended to be at least somewhat greater then the width and length of the intended slot. In most cases, the reinforcing sheet will extend the full length of the sheets making up the void filler. The width can be at least double the width of the intended slot. While it is possible that the size of the reinforcing sheet can coincide with the outer dimensions of the corrugated sheet material making up the void filler, in most cases, it is anticipated that it will be somewhat less in order to reduce the bulk and weight of the finished void filler. It is also desirable that the corrugated sheet layers, positioned above and below the reinforcing sheet strip, will be partially indented or embossed in an area slightly greater then the reinforcing strip in order to compensate for the thickness of the reinforcing strip so as not to create a bulge in the outer surface of the void filler.

The direction of the flutes in the corrugated material are usually aligned all in the same direction. This direction is parallel to the longitudinal axis upon which the forces are applied. The fiberboard reinforcing strip is usually cut in the length or long direction perpendicular to the grain of the fiberboard material. Thus, the grain of the reinforcing fiberboard sheet is arranged perpendicular to the direction of the flutes of the corrugated material. With the corrugated material and one or more reinforcing strips permanently secured in position with a suitable adhesive or other fastening arrangement, the slot having predetermined dimensions in both length and width is cut in the member usually perpendicular to the outer edge. The slot or slots provided in each member are arranged so that two or more of the members can be assembled into void fillers having various desired shapes.

It is to be understood that the size of the void filler and the depth of the individual slots can be arranged as desired to fit the need of the specific void filler product.

It is also to be understood that while the description provided in this patent application refers primarily to corrugated cardboard and fiberboard sheets in making up the individual parts of the void filler, it is possible that any type of sheet material, such as metal, plastic, paper or other suitable material can be used in the fabrication of the members making up the individual parts. It is also understood that, any number of reinforcing strips can be utilized in each member, and one or more of the reinforcing strips can be sandwiched between each of the corrugated sheets or they can alternate between sheets, as desired, to provide the reinforcing support that may be desired.

In this way, a much stronger void filler member and void filler can be produced which can withstand a considerably greater compression load then the standard void fillers which are presently used. At the same time, the cost of providing this greatly improved capability is relatively low and easy to produce during the manufacture of the member.

BRIEF DESCRIPTION OF THE DRAWINGS

The present invention will be better understood by reference to the following detailed description of the preferred embodiment of the invention when taken in conjunction with the drawings wherein:

FIG. 1 shows a cut-away of the rear portion of a trailer truck showing a void filler according to the present invention positioned between the lading and the outer rear doors of the trailer;

FIG. 2 shows an assembled void filler having a reinforced slot configuration according to the present invention;

FIG. 3 shows a partial cut-away of the reinforced slots provided in two void filler members;

FIG. 4 is an exploded view of the construction of the void filler member, including the slot reinforcing strip;

FIG. 5 is a cross-section view taken along lines 5—5 of FIG. 3;

FIG. 6 is a cross-section view taken along lines 6—6 of FIG. 2; and

FIG. 7 is a cross-section taken along lines 7—7 of FIG. 2.

DETAILED DESCRIPTION OF THE PREFERRED EMBODIMENTS

Turning now more specifically to the drawings, FIG. 1 shows a cut-away of the rear portion of a tractor trailer T having over-the-road double wheels W and a rear door D. A lading or cargo L is positioned within the interior of the tractor trailer T. Usually a space or void S occurs within the trailer between the lading L and the door D. In the same way, it is possible that a space S may exist between the lading L and the sidewall E of the trailer T. In this figure, the interior of the tractor trailer T can be seen with a void filler 10 according to the present invention positioned between the lading L and the rear door D. The void filler is designed to have a height and width which generally coincides with the dimensions of the space S. In this way, the void filler 10 fills the space S and prevents the lading L from moving or shifting during transportation. Without the void filler 10 in position the lading can heave or shift causing damage to the cargo as well as possible damage to the structure of the trailer T. In addition, shifting of the cargo can make it very difficult and expensive to unload the lading and possibly make it dangerous for the crew performing the unloading operation.

In FIG. 2, the void filler 10 is shown rotated 90° with the load carrying edges 12, 14 of the individual members 16, 18 positioned so as to be facing directly up. Cross members 20, 22 are shown interconnected with the compression support members 16, 18 forming a rigid lattice type void filler 10. It is to be understood that the present invention can be directed to any type of void filler having a slotted coupling arrangement and any number of main support members as well as cross members. The arrangement which is shown in the drawings is merely presented for illustrative purposes. The invention itself is not to be limited to any specific void filler configuration.

The support members 16, 18 are spaced apart and held in proper position by the cross members 20, 22, respectively. Slots 24, 26 in member 16 and 28, 30 in member 18 are shown. Corresponding complementary slots 32, 34 are provided in cross member 20 and complementary slots 36, 38 are provided in cross member 22.

The corresponding slots, such as slot 28 in compression support member 18 and slot 36 in cross member 22, usually have lengths which are one-half of the overall height of the members 16–22. In this way, each of the members have substantially the same strength in the slotted area. It is to be understood, however, that a shorter slot can be provided in say, the compression member 18 with a longer complementary slot provided in the cross member 22. This is to say that, as an example, the slot 28 can be approximately one-third of the width or height of the compression member 18 while the cross member slot 36 would be two-thirds of this dimension in order to complement and fit the first slot. In this way, the members fit together so that the upper edges 12, 14 of the compression member 16, 18 are even with the upper edges 40, 42 of the corresponding cross members 20, 22. Thus, each of the compression members and cross members are in full contact with the lading as well as a bulkhead, side E or door D of the trailer T. In this way, maximum compression load can be stabilized and absorbed by the void filler 10.

It is also possible that the overall length of the combined dimensions of the depth of the slots, such as 28, 36, can be less than the total height of the members 18 or 22. In this way, the edge 42 may extend above the edges 12 and 14 in the compression members 16, 18 whereby the compression forces will be applied against the upper edge 42 of the cross member 22. Although this arrangement is feasible it is not as desirable, since all of the compression forces would be transferred to the intersecting member at the base or end of the individual corresponding slots.

FIG. 3 is an illustration of one of the complementary interconnecting slotted arrangements shown in FIG. 2. The compression support member 18 including slot 30 is positioned vertically while the cross member 20 with slot 32 is positioned at a 90° angle above and aligned so that the slots will interfit and couple. Reinforcing strips 44, 46 are embedded within the members 18, 20, respectively, to reinforce and strengthen the slotted area within the members. As will be explained later, the reinforcing strips 44, 46 are embedded between the laminations or layers making up the compression support member 18 or cross member 20.

FIG. 4 is an illustration of how the members comprising the void filler 10 can be fabricated to provide a very strong but lightweight member. For illustrative purposes, reference is made to the cross member 20 in this figure. It is understood that this same description could apply to any void filler cross member which may be included as applicable to this invention.

In many of the void fillers which have been provided in the past, a plurality of corrugated paperboard sheets, such as 50–64 and having generally the same outer dimensions are aligned and laid up or stacked to form a void filler member 20 having a relatively thick cross-section. In most cases, the edges 40, 41 of each of the sheets 50–64 are aligned so that the edges form a relatively flat surface for the application of the compression forces during use of the void filler 10. It is known in the corrugated materials art that the maximum strength of the corrugated sheet material is in a direction parallel to the flutes of the corrugations. Thus, as shown in sheet 64 the flutes in each of the sheets are aligned and arranged perpendicular to the edges 40, 41. While it is shown that the maximum strength is obtained by aligning the flutes of all of the sheets in the same parallel direction, it is possible that some of these sheets can be alternated and arranged 90° to provide additional strength in the sides of the void filler member.

In order to provide a unique reinforcing benefit in the void filler member, a strip of flat sheet material, such as fiberboard or other corrugated or non-corrugated material 44, can be sandwiched between one or more of the sheets making up the member 20. If the reinforcing strip 44 has a cross grain or direction of increased strength, as shown by the arrow A it is desirable that the direction of this cross grain should be laid 90° to the direction of the flutes of the majority of the sheets making up the member.

Depending upon the width and depth of the anticipated slot to be cut in the member, the dimensions of the reinforcing strip 44 are determined usually by doubling at least the width of the anticipated slot in order to provide 50% addition material on each side of the slotted area. The length of the strip can extend slightly beyond the anticipated length of the slotted area, but in most cases it will be desirable to extend the strip the full width of the member, as illustrated in FIG. 4. It is also understood that the reinforcing strip can be considerably larger and actually coincide with the overall outer dimensions of the individual sheets or layers making up the member.

Where the slot reinforcing strip 44 is relatively narrow, as illustrated, it is desirable to provide a recessed or embossed groove having dimensions which are slightly larger then the reinforcing strip 44 impressed within the surface of the adjacent layers which correspond to the location of the reinforcing strip 44. In this way, the thickness of the reinforcing strip 44 is absorbed in the thickness of the adjoining sheets so that an increased thickness or bulge is not created in the center portion of the overall void filler member. On the other hand, if a bulge or increased thickness in the member is not of concern, the indented recess area can be omitted.

After the reinforcing strip 44 is embedded within or between the layers 56, 58, additional layers or sheets are added and the entire unit is secured by a suitable adhesive or other fastening arrangement. After the reinforced sheet has set and the member is completed the desired slot can then be cut in the member using any conventional method.

It is to be understood that while only a single reinforcing strip 44 has been shown, it is also possible that any number of additional strips 43,45 can be included and positioned as illustrated in Figure. Thus, a reinforcing strip can be provided in between each of the contiguous sheets to provide maximum reinforcement in the slotted area.

The prior art slotted void fillers, because of the fact that most of the laid up sheets making up the void filler are arranged with their flutes in a common parallel direction, experience a considerable weakness in the slotted areas, especially at the end of the slots. Thus, the void filler members have a tendency to bend or fold in these areas. The present reinforcing strip or strips as provided in the present invention prevent and reinforce this potential fold area and maintains the rigidity and strength of the member. This feature greatly enhances the load carrying capacity of each of the void filler members and eliminates or reduces the potential for the folding and failure of the entire void filler.

Although a new and novel reinforcing arrangement for a slotted void filler has been shown and described in this application, it is to be understood that any modifications or changes in the reinforcing arrangement or structure of the slotted void filler is considered to come within the scope of the appended claims.

We claim:

1. An void filler made from a plurality of members each having a reinforced slotted area, said members being connected and held in fixed position by said reinforced slotted areas, said reinforced slotted areas are arranged to prevent the folding and collapse of the members during use, said void filler being used to absorb a compressive load by restricting movement of a lading within a hauling vehicle, said void filler comprising;
   a) two or more of said members, each member having an outer edge and being formed from a plurality of corrugated sheets, each sheet having parallel corrugated flutes, said sheets being fastened together by suitable fastening means to form a relatively thick member;
   b) coupling slots formed inwardly from, the outer edge of two or more of said members and comprising a portion of the slotted areas, said slots having a generally elongated configuration defining a perimeter edge; and
   C) a reinforcing means arranged around the perimeter edge of one or more of the slots to strengthen the area around said slots and the void filler members and comprising a portion of the slotted areas.

2. An improved void filler as defined in claim 1 wherein said corrugated sheets are made from corrugated paperboard.

3. An improved void filler as defined in claim 1 wherein the fastening means is a suitable adhesive.

4. An improved void filler as defined in claim 1 wherein all of the individual corrugated sheets making up each said member have the same outer perimeter dimensions.

5. An improved void filler as defined in claim 1 wherein each said elongated coupling slot has a length and width dimension making up a rectangular configuration, the length dimension being considerably greater than the width dimension.

6. An improved void filler as defined in claim 5 wherein two of said members have complementary slot length dimensions of the respective slots which equal the width of the members.

7. An improved void filler as defined in claim 6 wherein the length of each slot is one-half of the width of the member.

8. An improved void filler as defined in claim 1 wherein each coupling slot has a width dimension and length dimension making up a generally rectangular configuration wherein the length dimension is substantially greater then the width dimension, said reinforcing means is an elongated rectangular fiberboard strip wherein the strip has a width dimension which is at least double the width dimension of said coupling slot, and the length dimension of the reinforcing strip is considerably greater than the length of the respective coupling slot.

9. An improved void filler as defined in claim 8, wherein the strip is centrally aligned with the respective slot and is embedded between two of the corrugated sheets, and a depression having a size slightly greater than the strip is formed in at least one of the adjacent corrugated sheets.

10. An improved void filler as defined in claim 1 wherein said reinforcing means is a flat strip arranged around the perimeter of the coupling slot and positioned between two of the adjacent corrugated sheets making up the member.

11. An improved void filler as defined in claim 10 wherein the flat strip has the same outer perimeter dimensions as the corrugated sheets making up the member.

12. An improved void filler as defined in claim 1 wherein the reinforcing means is an elongated rectangular strip having a width which is approximately twice the width dimension of the respect slot, and the width dimension of the rectangular strip is arranged to coincide with the width dimension of the slot.

13. An improved void filler as defined in claim 12 wherein the length of the rectangular strip coincides with the width of the respective member.

14. An improved void filler as defined in claim 1 wherein the reinforcing means is a sheet of relatively rigid material which has a width greater than the width of the respective coupling slot and a length which is greater than the length of the respective coupling slot.

15. An improved void filler as defined in claim 14 wherein two or more of the reinforcing sheets are positioned between the corrugated sheets making up the member, said reinforcing sheets being aligned so that the width dimension is arranged at an equal distance on either side of said respective coupling slot.

16. An improved void filler as defined in claim 14 wherein the sheets making up the reinforcing means is fabricated from fiberboard having increasing strength in one direction and the strength direction of said fiberboard is arranged perpendicular to the length dimension of said respective coupling slot.

17. An improved void filler as defined in claim 14 wherein an embossed groove sized slightly greater than the length and width dimensions of the reinforcing sheet is impressed in a surface of an adjacent corrugated sheet.

18. An improved void filler as defined in claim 1 wherein the flutes in each of the corrugated sheets are aligned generally in the same direction.

19. An improved void filler as defined in claim 18 wherein each member has a first and a second edge which are positioned perpendicular to the corrugated flutes making up the members and are arranged to receive the compressive forces applied to said void filler, and the respective coupling slot is formed in either the first or second edge.

20. An improved void filler as defined in claim 18 wherein each coupling slot has a length and width forming a rectangular configuration wherein said length is considerably greater than said width, the length dimension being arranged parallel to the corrugated flutes of the respective member.

* * * * *